United States Patent

[11] 3,615,363

[72] Inventor  Leopoldo Ruiz Montes de Oca
                San Francisco 15, Mexico City 12, Mexico
[21] Appl. No. 774,327
[22] Filed     Nov. 8, 1968
[45] Patented  Oct. 26, 1971

[54] PROCESS AND APPARATUS FOR RECOVERY OF MERCURY FROM ORES CONTAINING IT
     8 Claims, 5 Drawing Figs.
[52] U.S. Cl. .................................................. 75/81, 266/16
[51] Int. Cl. ........................................................ C22b 43/00
[50] Field of Search ............................................ 75/81, 1, 6; 266/16, 20, 24, 9

[56]              References Cited
              UNITED STATES PATENTS
1,728,359  9/1929  Ormont ........................ 75/81
2,302,841  11/1942 Connolly ...................... 75/81
2,311,648  2/1943  Duncan ........................ 266/20
2,939,695  6/1960  Gates ........................... 266/20
3,037,759  6/1962  Smith ........................... 75/81 UX Primary Examiner—Winston A. Douglas
Assistant Examiner—A. Skapars
Attorney—Imirie & Smiley ABSTRACT: A process and apparatus for the recovery of mercury from mercury ores comprises heating a body of the ore in a closed chamber to decompose it into mercury and other vapors, transferring the vapors by means of a jet of injected air to a condensing system formed by at least one generally spirally disposed horizontal conduit having its lower portion open and immersed in a body of cooling water and its upper surface cooled by a water spray, and collecting the condensed liquid mercury in a trough containing the water located under the conduit, and having a sloping bottom to facilitate collection.

INVENTOR

LEOPOLDO RUIZ MONTES DE OCA

PROCESS AND APPARATUS FOR RECOVERY OF MERCURY FROM ORES CONTAINING IT

SUMMARY OF THE INVENTION

The present invention provides a new process for beneficiation of mercury from ores containing it, which fundamentally consists of achieving a sublimation of these ores to obtain mercury vapors, rapidly and with great cleanness, to afterwards condensing the obtained vapors using novel aspects, that result in the attainment of a greater amount of mercury, carried out readily, economically and with a high degree of cleanness.

The first step in the process, i.e., the sublimation of the ores to produce mercury vapors is carried out in an industrial furnace characterized by having an isolated recess or hermetically sealed chamber, related to the fireplace or heat source, inside of which the calcination of the ores is carried out, thus preventing the sublimation product vapors from mixing with gases and waste gases evolving from the combustion of the furnace heat source; said recess having duly connected at the top thereof an air injector needed for handling the product vapors from sublimation. This industrial furnace has a heat source and fireplace wherein the temperature is raised to the desired rate and a stack to allow for the outflow of the combustion gases and waste gases, which are completely independent from the ores calcination chamber; i.e., the furnace is unique in that the calcination recess or chamber receives heat only from the furnace fireplace, without intermixing with the gases and waste gases from the necessary combustion to raise the temperature.

The ore to be treated is placed in trays or containers of a suitable size to be introduced within the hermetically sealed and isolated recess in the furnace. The duly crushed ore is placed in said trays extended over the entire surface thereof without forming a thick layer, to obtain, by placing the material in this way, a larger calcination ore surface and readily attain the entire sublimation of ore under treatment.

The calcination recess or chamber is fed by introducing the trays containing the ore and removing them after calcination has been achieved, which simplifies and facilitates the tedious task of feeding and discharging the furnace.

When the trays containing the crushed ores are placed within the calcination chamber and after starting the furnace operation, the ore receives heat transmitted through the hermetically sealed walls of the combustion recess or chamber, without the ore having direct contact with the combustion process. When the temperature within the chamber is raised to a sufficient level, the ore starts to sublimate, evolving at first water vapor, then sulfur vapors and finally mercury vapors.

As the vapors evolve, following the physical laws of the gases, they have a tendency to move upward and are received in the upper part of the chamber, which chamber constitutes a gasification chamber. As the vapors remain in said gasification chamber they can be handled at will by introducing air into the chamber through an air injector specially connected for this purpose. When the air is introduced within the gasification chamber a continuous steam of vapors is formed, which are drawn by the draft pipe to be carried through a duct into the condensers area for further treatment.

By means of this process used for the sublimation of the ore, the contamination of the vapors obtained, which are later treated in the condensers, with the exhaust gases and debris resulting from combustion of the heat source in the furnace, is prevented, the system thereby providing for the attainment of great purity in the vapors to be treated, and furthermore, a voluntary handling of the vapors means of air injection can be achieved.

The high-purity vapors obtained by the sublimation process above mentioned, are carried through an hermetically sealed duct into the condensation system wherein they are to be treated.

This new condensation system for the mercury vapors treatment comprises a high-capacity container containing water at a permanent level; over this permanent water surface there is a hollow half-round or inverted tubular half-section which extends horizontally with the bottom portion of its opposite walls immersed into the permanent water level, thus forming a closed duct, the web of which is formed by the sidewalls and the roof of the tubular half-section or half-round and at the bottom thereof by the surface level of the water or water bed. The duct thus formed has its bottom part or floor constituted by the permanent water level in its complete cross and longitudinal extension, i.e., the continuous bed or floor formed by the permanent water level is a continuous seal that prevents the leak of the vapors to be treated from the duct.

The mercury vapors obtained by the ore sublimation within the hermetically sealed recess or chamber in the furnace, can be controlled at will by the air injector to be selectively exhausted through the closed duct to be carried to the condenser itself, in which the cooling process starts, using as refrigeration means the continuous seal of water of the condenser duct and the water sprinkled over the sidewalls and the roof of said duct by a sprinkler system.

While the vapors remain and slowly move inside the cooling duct, they condense slowly by cooling upon contact with the cool walls of the duct and with the water forming the duct bed. As the cooling process of the mercury vapors accelerates, these are condensed and deposited on the seal or bed of water, already in the liquid form presented by this metal in its natural state, and mercury precipitates, by gravity, to the bottom of the water container. This treatment is carried on until water-immiscible, complete condensation of the mercury vapors is attained, whereby the extension of the duct with the continuous water seal will be dependent on the amount and temperature of the vapors to be treated, the residues of which, after treatment, are exhausted from the condenser by means of a stack located at the end of the continuous water sealed duct, which vapor residues are so poor in metal contents that a further condensation is not possible, as they are thrown out at a temperature of 20° C. or less.

Mercury, already in its natural state, deposited on the water surface sealing the bottom of the duct, falls by gravity to the bottom of the container, and this step can be accelerated by moving or stirring the water. Mercury settles on the bottom of the water container, and this bottom provided with a slant allows the slipping of the mercury which is concentrated at a given single spot from where the metal can be recovered through a siphon trap. Since mercury in its natural state is water-immiscible, during the precipitation through the water and sliding thereof on the bottom of the container, it leaves its contaminating impurities as debris suspended in the water of the container, thus being recovered in a simple manner and with a high degree of purity.

BACKGROUND OF THE INVENTION

1. Field of the Invention

The present invention comprises a new process for the beneficiation of the mercury from ores containing it, pertaining to the field of ore beneficiation and, in particular, to beneficiation of mercury-bearing ores, such as cinnabar, calomel, coccinite, argental mercury, tremanite, etc., since it allows, by the treatment of these ores, the attainment of a perfect sublimation of the same, maintaining the vapors to be treated at a high-purity level, to further advantageously condense them by the novel system of a continuous water seal or bed in the condenser ducts.

This invention satisfies a very important need within the mining industry devoted to the beneficiation of mercury, as through the use thereof the calcination process expedited a better sublimation of the ores is attained, the vapors to be condensed are kept with a higher degree of purity, the condensation process is accelerated, the general maintenance of the equipment is made easier, the exit of toxic gases harmful to the workers is avoided and, above all, a greater amount of mercury is obtained as compared with the industrial processes presently in use, which allows working with very low-grade ores whose beneficiation through other processes is not economical. The fact that when using the present process up to a 95 percent of the mercury contained in the ores is obtained, is of great importance, thus avoiding the unnecessary waste of this rare ore which constitutes one of the main nonrecoverable natural resources of Mexico.

2. Disclosure of the up-to-date knowledge in the field of the present invention:

Mercury was known since ancient times and at the beginning it was obtained in rare natural deposits where it was found in its natural liquid state.

The first known method for obtaining mercury is the one described by Theophrastus in the year of 321 B.C. in his Treaty on Stones, wherein he points out that it is possible to obtain mercury by crushing natural cinnabar with vinegar in a copper mortar.

Argentium vivum or hydrargyrum, as it was known in ancient times, could also be obtained by heating natural cinnabar in an iron vessel and then allowing for the cooling of its contents, according to a method described by Dioscorides in the first century of our era. Later on, in the eighth century of the Christian Era, Geber asserted that mercury could be obtained by distillation over lime, glass or salt. The Arabs, to obtain the "azogue" (quicksilver), as they named it, used a process known as Xabecas, by which clay kettles were restrained within the furnace where the cinnabar was calcinated. It was not until 1693 that in the Peruvian mines of Huanacavelica an effective method was developed, which process comprises the calcination of the ore and the further condensation of vapors thus obtained in buckets; the inventor of this process was Lope Saavedra y Barba.

The main processes used at present to obtain mercury in an industrial form are the following:

Retort furnaces process: These furnaces are tubes where the ore is introduced by shoveling, the opened ends of the tubes are then closed and the ore is calcinated; the vapors of which are exhausted through a stack together with the exhaust gas and combustion debris. When the material has been calcinated the slag is removed from the tubes by hand, whereby the workers are exposed to the toxic vapors evolving from the hot residues. The condensation chamber in this process is built with firebrick and cement lined in the inside, thus causing very often crackings in the floor and in the walls through which vapor escape causing high losses, This process provides a yield of mercury from the ores of at most about 60 percent it should be noted that this is the process used mainly at present in Mexican mines.

Espirett Furnace: This is a rectangular furnace where alternate layers of charcoal and the ore to be treated are arranged, then combustion is started in the charcoal layers to achieve calcination; its condensing system comprises closed cement-lined ducts made out of bricks. This system is also widely used in our mines for beneficiation of mercury and was introduced in Mexico during the last century.

Gould Furnace: This is a horizontal tube lined in its inner wall with refractory bricks and mounted with a slight slope, having a rotational movement and a continuous feed and discharge of ores. Calcination is carried out with direct fire on the tube outside wall; then the vapors obtained together with the fuel gases and combustion debris discharge into the condensation system formed by metallic pipes arranged with zigzag sections having at the bottom vortex thereof small water pockets where liquid mercury is deposited.

Herreshoff Furnace: This system is formed by a cylindrical vertical furnace of sheet metal structure lined on the inside walls with refractory bricks, sometimes 50-feet high; in the inner portion of the furnace there are recesses where the ore is placed by means of a rotatory central column which conveys the ore from one recess to the another until calcination is completed. The condensing system is generally the same as in the Gould Furnace.

Scott Furnace: This is a vertical type furnace with a continuous charge and discharge system and a condensing system similar to the ones in the Gould and Herreshoff furnaces.

The above systems are the ones more often used by the mining industry specialized in mercury beneficiation, and therefore it is pertinent to point out the advantages that the new, above-described, process have as compared with all of the systems presently used; which can be summarized as follows:

a. A rapid feed of the ores to be calcinated inside the hermetically sealed chamber, as this step is carried out in trays preloaded with crushed ore, thus avoiding the health harmful dust evolving from the ore that might clog the ducts in the system; as well as, due to the swiftness and ease of the operation, costly heat waste in the furnace is avoided.

b. This system has a calcination and evaporation hermetically sealed chamber to effect therein the sublimation of the ore to be treated, thus, as the chamber is hermetically sealed, preventing contamination of the mercury vapors with combustion debris, formed by undesired gases, ashes and dust, which might enter into the condenser clogging the ducts, and greatly increasing the equipment maintenance work, and above all, hindering the effectiveness of the condensation process, which results in great losses of mercury vapors.

c. Due to the distribution of the ore batch to be treated in the trays, which distribution consists in providing the ore with a great surface ore and reduced thickness, the furnace temperature can be transferred in optimum form over the entire surface of the ore, thus achieving an homogeneous calcination and therefore, fuel savings.

d. Due to the unique distribution of the ore to be calcinated a larger burning surface is achieved, therefore obtaining a more effective ore sublimation.

e. When sublimation of the ore takes place within the hermetically sealed chamber, depending on the different sublimation temperatures, water vapor is first evolved, then sulfur vapors and finally mercury vapors, which gases can be controlled at will by means of the air-injecting system to the hermetically sealed calcination chamber, and the water and sulfur vapor can be readily removed, leaving only high degree of purity mercury vapors which are further treated afterwards. This vapor control by means of injected air is quite important as it allows the quick removal of undesired vapors that might hinder the condensation process of the mercury vapors, and at the same time, this voluntary and controlled air injection completely prevents the stationing and combination of the various gases evolving from the sublimation of the ore which represent a big problem in the beneficiation of mercury process, as it promotes reversion of the physical-chemical process in which the different gases are molecularly recombined resulting in synthetic untreatable mineral which represent a high loss in this field of the mining industry.

f. By operating the novel mercury condensation system, comprising a horizontal cooling duct sprinkled cooled, and with a continuous water bed or seal, there is achieved a fast and effective condensation of mercury vapors thus recovering mercury in its natural state as contained in the vapors up to a yield of 95 percent.

g. By means of the air injection into the calcination chamber a voluntary control of the gases to be treated is achieved, and the path of mercury gases through the condenser can be slowed down or accelerated, as needed, to achieve optimum condensation of said gases.

h. Mercury condensed within the cooling duct is deposited over the adjacent water bed or seal, and then, by gravity, drops into bottom of the water container whose bottom has a slant over which the mercury slides until it concentrates in a single spot, from which through a siphon trap mercury is recovered cleanly, readily and in a high-purity state.

i. Once the sublimation and condensation of a given amount of ore is completed the trays containing calcinated ores are quickly and readily withdrawn from the hermetically sealed calcination chamber, and are replaced by another batch of loaded trays, thereby saving time, avoiding heat loss from the furnace and protecting the workers from extended contact with the highly toxic mercury vapors.

j. In this system of obtaining mercury, when vapors to be condensed are separated from the combustion debris and gases, the clogging of the ducts by said debris is prevented, thus avoiding the need for the tiresome task of cleaning the ducts periodically thus reducing the high cost involved in the maintenance of the equipment, and besides a hazardous job for the workers in charge of this operation is also avoided. Through the novel system of charging and discharging ores to and from the hermetically sealed recess of the furnace by means of trays, there is also avoided the extended contact of the workers with the highly toxic mercury vapors which cause a high degree of mortality between those workers devoted to this task. This is one of the main advantages offered by the present system of beneficiating mercury, as it avoids the drawbacks of mercurialism either in its acute form, represented as stomatitis gastralgia or dysentery or in its chronic form as intoxication through skin and the respiratory tract.

k. This process for obtaining mercury also allows for the beneficiation of very low grade minerals which are presently considered as economically untreatable, since by means of the use of this process it is possible to attain up to 95 percent of mercury borne by different ores containing the same. There is also of great importance the fact that, by using this process, it is possible to attain up to 40 percent more mercury, as compared to the methods employed in the present days representing a great economical benefit as well as great savings in the mining reserves of this important nonrecoverable natural resource.

DISCLOSURE OF THE MAIN PARTS OF THE INVENTION

Figure 1:
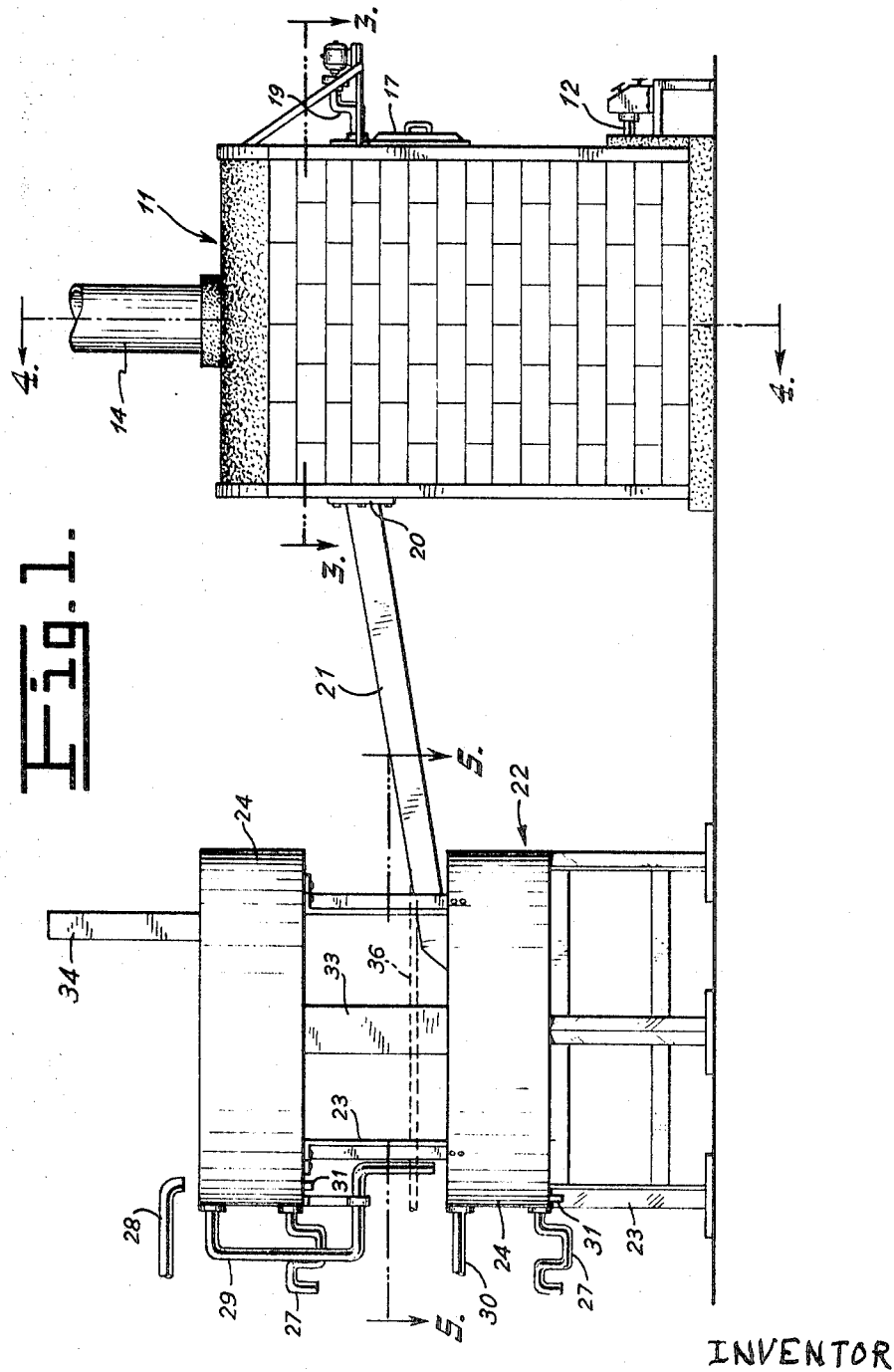
FIG. 1 is a side elevation view of the complete arrangement, wherein the furnace, duct and condenser are shown with all the parts appearing from this angle, duly numbered, as well as the section lines for taking the subsequent figures.
Figure 2:
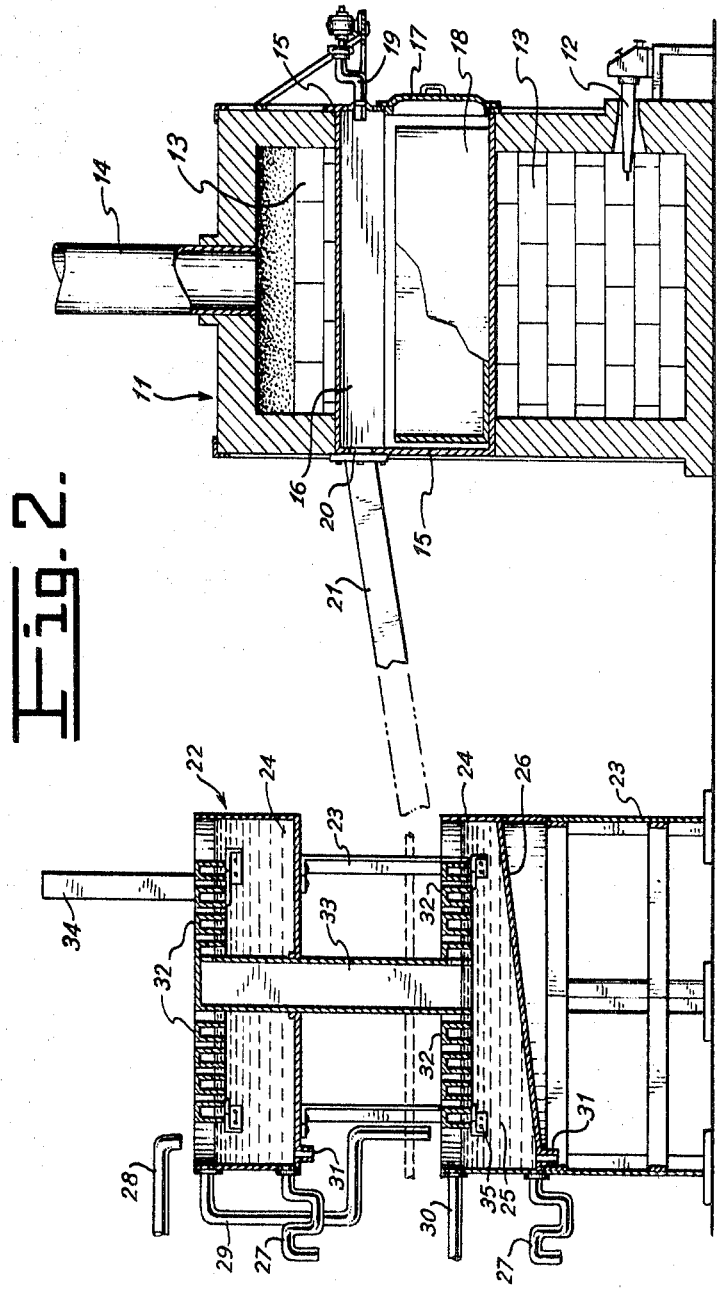
FIG. 2 is a side elevation view in longitudinal cross section of the arrangement wherein the furnace, duct and condenser are shown with all the parts appearing from this angle, duly numbered.
Figure 3:
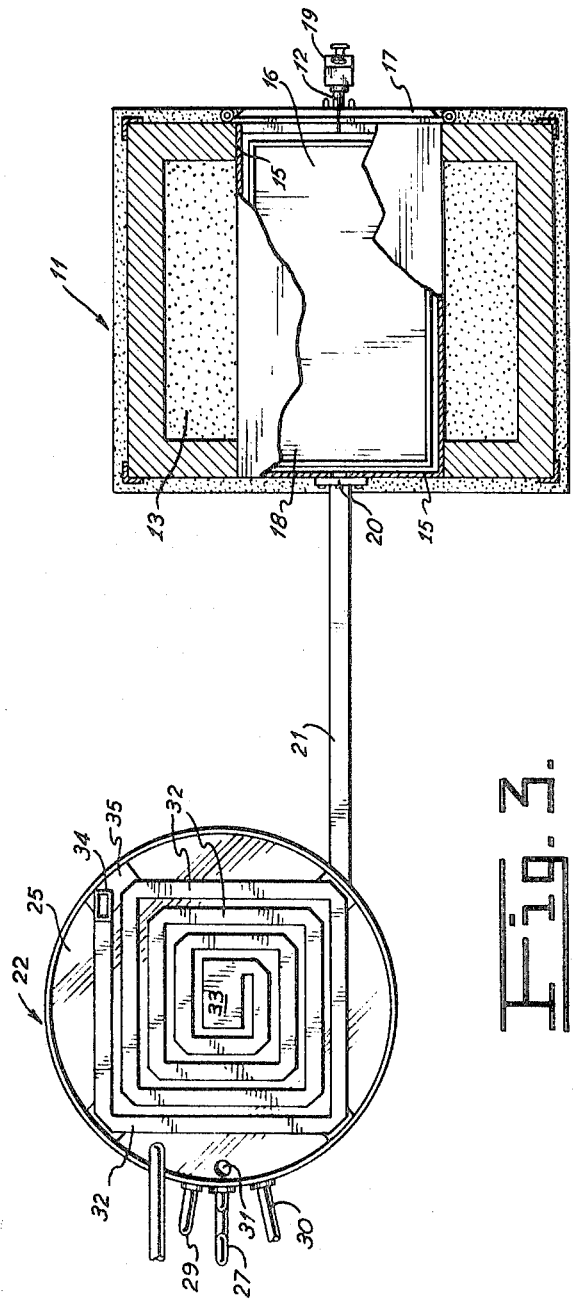
FIG. 3 is a plan view of the arrangement, with a cross section of the furnace following the line 3—3 of FIG. 1, wherein the furnace, duct and condenser are shown with all the parts appearing from this angle, duly numbered.
Figure 4:
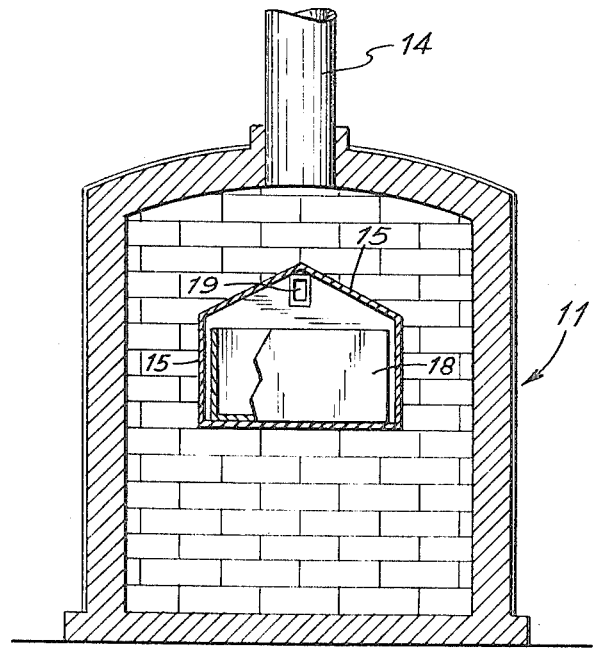
FIG. 4 is an elevational view of the furnace and a section taken in line 4—4 of FIG. 1, wherein all the parts appearing from this angle are shown, duly numbered.
Figure 5:
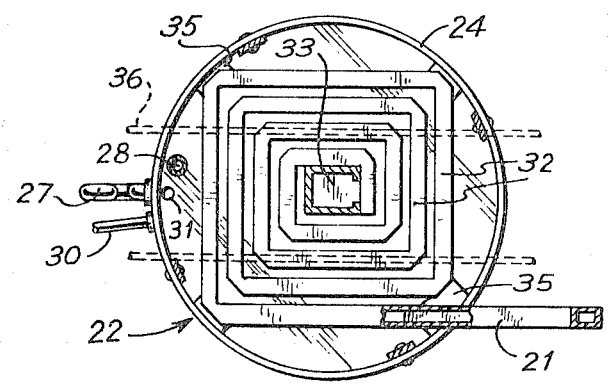
FIG. 5 is a plant view of the condenser and a section taken on line 5—5 of FIG. 1, wherein all the parts appearing from this angle are shown duly numbered.

The numeral order to be used hereinafter, identified with arabic characters, is the same as observed in all the five Figures of the drawings, to illustrate always the same parts. The various elements of the apparatus are designated as follows:

11. Furnace and all the elements thereof.
12. Heat source or furnace burner.
13. Combustion chamber or fireplace of furnace.
14. Exhaust stack or chimney for combustion gasses and waste from the furnace.
15 Isolated and hermetically sealed recess or chamber for calcination and sublimation of ore.
16. Evaporation chamber wherein the vapors produced by the sublimation of ore are deposited, to be carried over into the condenser.
17. Tight closing door of the calcination chamber or recess.
18. Container or tray wherein the ore is deposited in order to charge and discharge said calcination recess.
19. Air injector for the voluntary control of the movement of gasses inside the gasification chamber and the condenser.
20. Exhaust draught pipe for vapors from the calcination chamber, to be treated at the condenser.
21. Enclosed duct for transferring the vapors from the calcination chamber into the condenser.
22. Mercury vapors condenser, and all the parts thereof.
23. Support means for containers or tubs.
24. Containers or tubs containing water and the cooling duct.
25. Water in the tubs at a permanent level.
26. Sloped or slanted bottom of the container or tub on which mercury slips down in its natural state to be collected in a single spot.
27. Siphon trap for collecting liquid mercury.
28. Tube or intake way for water, to fill up the containers or tubs.
29. Overflow tube from the upper container into the lower container, in order to maintain a permanent level at the water surface in the upper container.
30. Exhaust or drain tube for water in the lower container to maintain the permanent level of water at the surface thereof.
31. Discharge or drain hole of the containers or tubs.
32. Cooling horizontal duct with continuous water bed or seal.
33. Draught pipe for carrying the treating vapors into the second section of said condenser.
34. Stack for wastes and vapor debris already treated in the condensation system.
35. Supports for the horizontal duct provided with continuous water bed or seal.
36. Water sprinkler for cooling down the walls of the duct provided with continuous water bed or seal.

DISCLOSURE OF THE PREFERRED EMBODIMENT OF THE INVENTION

AND ITS OPERATION

Making now a more specific disclosure of the apparatus and the several steps of the process of the present invention, their several parts will be mentioned hereinafter, identifying the same with the same arabic characters, as far as the same be apparent in any of the five Figures of the accompanying drawings.

The process for beneficiating mercury from ores containing the same, consists of two basic steps wherein the novel features are presented referring the processes now in use. The first step consists in the sublimation of the elements contained in the ores to be treated, in such a form as to obtain high-purity vapors, using the ore at the maximum yield thereof, making the work in an easy and quick manner and to a high-security level regarding the health of the workers. Once the vapors are obtained, they are controlled at will by means of an air injector in order to pass them, in due time, into the condensation system, which system is characterized by the novel feature, relative to the prior art systems used for the condensation of mercury vapors, of passing the vapors through a horizontal cooling duct which is cooled by means of a sprinkling system in the outside, which duct has a continuous water bed or seal to accelerate the cooling of the treating vapors and to recover mercury as released from vapors, already in its natural liquid state.

The first step is effected in an apparatus having an industrial furnace 11 having a heat source or burner 12 which increases the temperature up to the desired level inside a combustion chamber or fireplace 13; this combustion chamber 13 having a stack 14 through which the combustion gasses and debris coming from the combustion chamber or fireplace 13 are expelled. This furnace is characterized by having an isolated and hermetically sealed recess 15 inside which the calcination and sublimation of ore to be treated is effected, which recess or hermetically sealed chamber 15 is completely isolated regarding the fireplace of said furnace 13, from which only receives heat through the hermetically sealed walls to attain the sublimation of ore located inside the said chamber or recess 15, this chamber having a tight closing door 17 which opens to allow for the pass into the container or tray 18 wherein ore to be subjected to treatment is located. In the upper inner position of said calcination recess 15 there is a space wherein the gasses from sublimation remain, this space constituting an evaporation chamber 16 into which it is possible to inject air through an air inductor 19, coupled to said chamber 16.

The ore to be treated is positioned, upon being duly crushed, on the tray or batch container 18 in such a form as to present a spread surface and small thickness, said tray 18, once duly charged, is introduced into the hermetically sealed calcination chamber 15, and the door 17 of this chamber 15 is hermetically tight-closed. Furnace 11 is then started by firing the heat source or burner 12 thus increasing the temperature of the combustion chamber or fireplace 13, which temperature is transmitted through the tight walls of the isolated calcination recess 15 in order to obtain the due sublimation of the ore deposited on the container or tray 18 located inside the calcination recess 15; the temperature to which the ore is subjected must be above 400° C., but always below 650° C., in order to avoid the reversion of the physical-chemical process of sublimation.

Gases and wastes produced at the combustion chamber or fireplace 13 due to the effects of said combustion, are exhausted through a stack which is completely independent relative to the exhaust or draught hole 20 for the mercury gasses to be treated.

When the ore deposited on the tray or container 18 located inside the calcination recess, receives the constantly increasing temperature, it starts to sublimate steam when the temperature raises up to 120° C., sulfur vapors when said temperature reaches to 220° C., and mercury vapors when said temperature arises up to an average temperature of 400° C.; all of these vapors following the Gas Law, move upward and deposit on the inner upper part of the calcination recess 15, which constitutes the evaporation chamber 16, wherein, by means of air injection, the vapors are controlled in order to handle and pass the same into the exhaust draught 20 for vapors to be treated, which draught communicates with the enclosed duct 21 through which said vapors are transferred into the condensation apparatus. This exhaust for the vapors to be treated is absolutely independent as regards the exhaust stack 14 for gases and debris from the combustion chamber or fireplace 13, for which reason the mercurial vapors are in a high degree of purity in order to be treated, in addition to allowing for the first and second sublimation vapors, i.e., those from water and sulfur, to be discarded quickly when the air injector 19 is started, so as to form an air current in the inside of the evaporation chamber 16 to exhaust the same through the exhaust draught for the gasses to be treated 20 and discard the same easily so as to avoid a contamination therewith of the mercury vapors produced at mean temperatures of 400° C. The mercury vapors remain at the evaporation chamber 16 and are forced, by means of voluntary air injection, through the exhaust draught for the vapors to be treated 20 and into the closed duct 21 across which said vapors are carried and into the condensation apparatus 22 wherein they are to be further treated.

Due to the array of the ore inside the tray or container 18, presenting an extended surface and small thickness, the homogeneous calcination of ore is facilitated, whereby the sublimation of all the metals borne by the ore is allowed thus obtaining the maximum yield from the ores by means of this system of beneficiation by sublimation.

Once the entire calcination of ore inside the isolated and hermetically sealed calcination recess 15 is completed, the door 17 of said recess 15 is opened and the tray 18 is removed containing the calcinated ore residues, and immediately is replaced by another tray 18 having fresh ore duly positioned, in order to be subjected to the calcination and sublimation treatment. This system of charging and discharging ore can be effected in a simple and very easy manner, thus avoiding the heat loss of the furnace 11 which, in turn, means fuel savings; furthermore, this process of charging and discharging avoid the exposure of workers to the continuous emanation of mercuric vapors, as occurs in all of the processes presently in use, which implies a great benefit for the workers during their labor, by avoiding an extended contact with toxic mercuric vapors.

When the tray container 18 containing the calcinated ores debris is with and a new container 18 with ore to be sublimated at the calcination recess 15 is introduced, and the door thereof 17 is hermetically closed, a calcination and sublimation cycle is ended and another one is immediately started, thus being possible to work in a continuous manner, and to avoid the tiresome tasks of discharging the furnace and cooling the same, as occurs with the processes presently in use.

The second step of the process for beneficiating mercury is carried out in a condenser apparatus for mercury vapors 22, which apparatus comprises water at a permanent level 25 over which extends a horizontal duct formed by a hollow half-round or reversed half-tubular section, the lower part of the opposite walls of which are immersed under the permanent water level 25, thus forming an enclosed duct 32, the web of which is formed by the walls and roof of said inverted half tubular section or hollow half-round, and the floor formed by the continuous water bed at a permanent level; said duct 32 thus formed having its lower part or floor formed by the permanent water level throughout the cross and longitudinal length, i.e., said bed or continuous floor constituted by the permanent level water forms a continuous seal for said duct 32 avoiding the leak therefrom of the treating vapors. This horizontal duct 32 provided with said water bed or seal is provided with a cooling system formed by tubing or sprinklings covering the same with a cool water blanket outside the same, in order to decrease the temperature of the treating gases, and supported by supports 35 fixing the same to the upper part of the walls of said tub or container 24.

Said containers or tubs 24 containing water 25 and the cooling horizontal duct 32 are supported by support means 23 maintaining the same at the necessary height so as to expedite the condensation process, as needed for each particular case. Said containers or tubs 24 are supplied with water, both by the sprinkling tubes 36 and by an inlet tube 28. Water is introduced into the containers or tubs 24 and these are filled up to the permanent level of the water surface 25 determined by the overflow tubes 29 and 30 located at the containers or tubs 24 at the desired height for the permanent water level 25.

These tubs or containers 24 have an inclined bottom 26 to expedite the mercury collection in its liquid state and at the lowermost part of said sloped bottom 26 have a siphon trap to trap therethrough all mercury deposited on the bottom of said container or tub 24. These tubs or containers 24 are provided with a drain hole 31 to drain out the water for cleaning and equipment maintenance purposes.

In the mercury vapors condensation apparatus the horizontal cooling duct equipped with continuous water seal 25 is comprised of more than a single container or tub 24 is also provided with a treating vapors draught pipe 33 to carry said vapors into the subsequent condensation units; said horizontal duct provided with continuous water seal or bed ending at a stack for the wastes and debris of the already treated vapors 34.

The mercury vapors exiting from the evaporation chamber 16 are handled by means of an air current, forcing the same to leave said chamber 16 through the draught hole for mercury vapors 20 to be carried over by means of closed duct 21 into the apparatus wherein the condensation is to be carried out.

When leaving said chamber 16 the vapors carried across the duct 21 are at a temperature ranging between 400° C. and 500° C., and the cooling process thereof starts when said vapors pass across the closed duct 21 to enter the cooling horizontal duct provided with continuous water bed or seal 32, located at the upper part of the containers or tubs 24. Inside this duct, cooled in the outside of the same by means of sprinkling devices 36, said mercury vapors begin to loss caloric units during their advance in the inside of duct 32 thereof, since both the cool walls of this duct 32 and the water of the bed or seal 25 have a great temperature difference as high compared to said vapors, whereby said treating vapors, when contacting the duct walls 32 and water seal 25, are cooled down thus starting the mercurial vapors condensation itself.

Upon condensation of the mercury vapors they pass the natural liquid state of mercury, and this latter deposits in the form of small drops on the water bed or seal 25 of said condensation duct 32, and hence precipitate by gravity into the slanted bottom 26 of said container or tub 24, sliding down thereon into the lowermost part of said bottom 26, wherein it is concentrated, and hence, passes to the siphon trap through which is recovered.

Said cooling horizontal duct 32 with continuous water seal 25 has a predetermined extension allowing for a decreasing temperature of the treating vapors to take place, down to 20° C., in order to perfectly carry out the vapors condensation process to which end the size of the cooling units is determined depending on the volume and temperature of vapors, so as to be able to cool down the same at a temperature of 20° C. or less.

In this instance, the mercury vapors travel through the duct web 32 and for each meter of said travel, they decrease their temperature, thus enabling an accelerated condensation process of said gaseous bodies as well as the conversion into mercury in its natural liquid state when said mercury vapors are condensed during the travel across said cooling duct 32 of the first unit; then, they ascend through the treating vapors draught pipe 33 to be again subjected to the cooling and condensing process at the next unit of said apparatus, wherein the travel is again effected across the horizontal duct web provided with continuous water bed or seal 25; and upon ending the travel, the temperature of said vapors must be lowered at 20° C. or less and, therefore, the whole condensation of these vapors has been carried out, which vapors are finally vented through a stack 34 for the waste and debris of the mercurial vapors already treated.

As said mercury vapors travel inside said cooling horizontal duct provided with continuous water seal or bed 25 they are cooled down upon contacting the duct walls 32 and the permanent water level 25, and the vapors condensation process is thus accelerated, with mercury being deposited on the continuous water bed or seal in its liquid natural state but when the optimum level has been reached, the condensation process decreases, thus being recovered a less amount of mercury due to the poorer state of the vapors traveling the duct 32.

As mercury in its natural state is immiscible, when it precipitates on this water body 25 and while falling on the sloped bottom 26 of said container or tub 24, said mercury is washed eliminating the contamination impurities, suspending them in water, which phenomenon enables the final recovering of mercury in a high purity state.

At said cooling duct 32, there are also condensed both water vapors and sulfur products from the sublimation or ore, the former being converted into water and the latter being suspended in water 25 of said container 24, thus avoiding the clogging of said duct 32 by sulfur, and minimizing the maintenance of this condensation apparatus, both in costs and in labor.

This process is carried out in a continuous form by conducting said mercury vapors across the cooling horizontal duct provided with continuous water seal 25, injecting air by means of the air injector 19, specially coupled to the evaporation chamber 16, whereby the condensation process can be effected in an uninterrupted manner.

It should be understood that the shape of the apparatus for the beneficiation of mercury constitutes a feature of this invention that is described and illustrated just as an example thereof, but the basic principles of this invention can be varied even by changing the arrangement of some of the mentioned elements, always within the spirit thereof.

The apparatus needed for carry out the new process of beneficiating mercury from ores containing the same, becomes thus just an example of this invention and it is to be understood that anyone in the art to which pertains this invention, can resort many variations, without departing from the scope of the invention, as defined in the appended claims.

I claim:

1. Process for recovering mercury from mercury ores, comprising the steps of:
   a. heating a body of mercury ore in an enclosed heating zone of a furnace and out of contact with the combustion gases forming the heat source from said furnace for a period of time sufficient to decompose the ore into vapors of mercury and other ore constituents;
   b. collecting said vapors in the upper portion of said heating zone;
   c. transferring said vapors out of said heating zone by injection of a stream of air to a condensation zone formed by at least one generally spirally disposed horizontal conduit having its lower portion open and immersed in a body of cooling water and its upper surface cooled by a water spray, whereby said mercury vapor is condensed to liquid mercury which sinks to the bottom of said body of water; and
   d. recovering said liquid mercury.

2. The process of claim 1 in which said mercury ore is a sulfide of mercury.

3. The process of claim 1 in which said body of mercury ore is maintained in a said heating zone in a removable tray.

4. The process of claim 1 in which ore is heated to a temperature between about 400° C. and about 650° C.

5. The process of claim 1 in which the temperatures of said vapors is reduced by said cooling water to about 20° C.

6. Apparatus for the recovery of mercury from mercury ores comprising, in combination:
   a. a calcination and sublimation furnace including a hearth for combustion of fuel to provide a heat source;
   b. a heating and sublimation chamber located within said furnace and above said hearth, said chamber being sealed against contact with combustion gases from said hearth;
   c. means for injecting outside air into and in communication with the upper interior portion of said chamber;
   d. a conduit connecting said chamber to an external vapor condensing system for transfer of mercury and other vapors from said heating chamber to said condensing system;
   e. a vapor condensing system comprising at least one generally spirally disposed horizontal conduit having its lower portion open and in communication with a body of water, said conduit having its outer end connected to said transfer conduit (d), and a trough positioned beneath said lower portion of said spiral conduit to receive condensed mercury, and means for supplying water to said trough.

7. The apparatus of claim 6 in which said spiral conduit comprises an inverted hollow half-round or half-tubular configuration forming its upper portion, and includes means for spraying cooling water upon said upper portion.

8. The apparatus of claim 6 in which said trough of the condensing system is provided with a sloping bottom to facilitate collection of mercury, and means for removal of liquid mercury at the lower portion of said sloping bottom.

* * * * *